E. C. KIRKWOOD.
Apparatus for Cutting Chocolate.
No. 146,462. Patented Jan. 13, 1874.
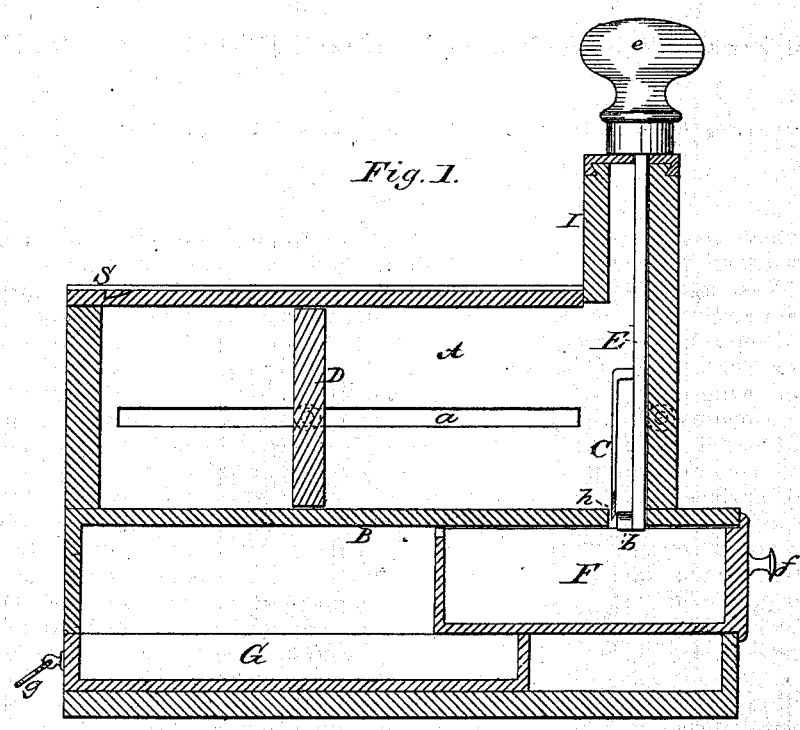
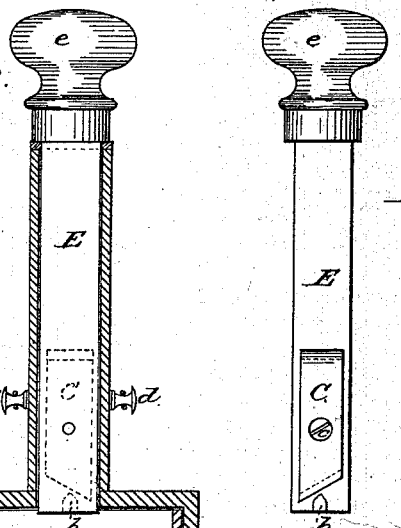
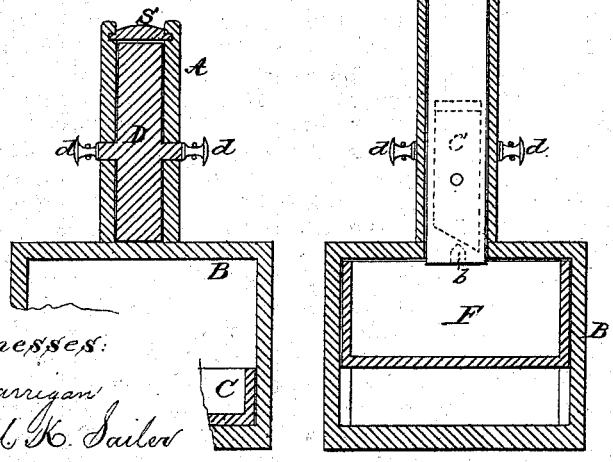
Witnesses:
D. Carrigan
Thad. K. Sailer
Inventor:
Edwin C. Kirkwood

UNITED STATES PATENT OFFICE.

EDWIN C. KIRKWOOD, OF WASHINGTON, DISTRICT OF COLUMBIA.

IMPROVEMENT IN APPARATUS FOR CUTTING CHOCOLATE.

Specification forming part of Letters Patent No. 146,462, dated January 13, 1874; application filed May 22, 1873.

*To all whom it may concern:*

Be it known that I, EDWIN C. KIRKWOOD, of the city of Washington, District of Columbia, have invented certain Improvements in Apparatus for Preparing Chocolate and Similar Articles for Confectioners, Families, &c., of which the following is a specification:

This invention relates to that class of apparatus used to reduce chocolate and similar materials to fine or comminuted state by cutting or shaving the surface of a cake, such as is made by Baker, or the chocolate mass as found in the market; and it consists, first, in a feeding-channel, a gaged shaving or cutting tool, and a receptacle, so combined and arranged that the chocolate will have a constant feed toward and beneath the cutting-blade, which will remove consecutive shavings or layers, allowing them to fall into the receptacle; secondly, in combining with the feed-channel a follower, operated by springs or similar means, to force the chocolate against or under the knife, whereby a positive feed is obtained.

In the accompanying drawings forming part of this specification, Figure 1 is a vertical longitudinal section of my apparatus. Fig. 2 is a vertical transverse section through the knife-chimney and receptacle. Fig. 3 is a vertical transverse section in front of the follower. Fig. 4 is a view of the cutting or shaving tool.

Like letters refer to like parts in the several figures.

A represents the chocolate-feeding channel, which consists, in this instance, of a long narrow box or channel, placed vertically, and resting upon a base, B. The box A has long narrow slots on two of its sides, as shown at *a*, to allow of the passage and travel of the two lugs or projections *d* upon the follower D. This slot may be graduated so as to indicate the feed, and the projections *d* should be flat and narrow, so as to form guides, and keep the follower steady. At one end of the feed-channel A is a vertical chimney or channel, I, for the passage of the blade of the cutting-tool. This channel I must rise above the feed-channel A for a distance equal to the length of the cutting-blade C, and should be of sufficient diameter to permit the knife to play freely when gaged for the thickest slice or shaving to be cut. This channel I also provides a space for the spreading of the fine chocolate disengaged by the knife in the first part of its stroke, thereby preventing the knife from becoming clogged, which would inevitably occur if such a space was not provided for the chocolate, which occupies more space in its comminuted condition than when compacted in a mass, as in the cake. In the bottom of the feed-channel, in a line directly beneath the chimney I, and in the travel of the knife, is an opening, *h*, through which the comminuted chocolate falls or is forced into the receptacle F. D represents a follower, provided with lugs or projections *d*, traveling in slots *a* in the sides of feed-channel A. This follower D is made to force the chocolate against and beneath the knife by means of elastic bands or springs extending from projecting lugs *d* to similar projections upon the sides of the feed-channel A or knife-channel I; but it is evident a spring might be placed in channel A in rear of the follower or other well-known means substituted to accomplish the same end, viz., the constant feeding forward of the chocolate. E is the tang of the knife, to which the cutting-blade C is attached. This tang E projects a little distance below the end of the knife-blade C, and has upon it a projection, *b*, against which the chocolate abuts when the knife is raised to the highest point. The cutting-blade C should be of good material, and well tempered, so as to possess elasticity, which quality is required when the cut is to be altered. *c* indicates a screw, passing through the blade C, and into or through the tang E. This screw has two functions, first, to strengthen and steady the blade, and, second, to gage the cut by drawing the blade to or springing it away from the tang. F represents a small drawer or receptacle, sliding into the base B at a point beneath the knife and opening *h* in feed-channel A, and forms a receptacle for the cut or granulated chocolate. I have also provided a second drawer, G, which I term the "storage-drawer," in the base B, for the reception of one or more cakes of chocolate. This is desirable when the apparatus is used in families, for the reason that packages of chocolate, as found in the market, usually consist of two or more cakes, only one of which is placed in the feed-channel. I have also provided the feed-channel A with a slide, S, for the protection of the chocolate contained therein.

The operation of my apparatus is as follows: A cake or other compact mass of chocolate being placed in the feed-channel A, between the follower D and knife C, the knife is raised until it strikes the cover of chimney or knife-channel I, which will leave the lower end of tang E just below the line of the top of the feed-channel A. The follower D will press the chocolate forward beneath the knife (previously adjusted for thickness of cut) until it abuts against lug $b$ on tang E; the knife is then forced down, and the first chocolate cut will rise into the space in the chimney I, so that the knife will not clog. At the close of its stroke, the knob $e$ on the tang will strike the plate covering of the chimney, and the slight jar produced will free the knife, and cause the fine particles of chocolate to fall through opening $h$ into the receptacle F beneath.

The feed-channel A is a little longer than a cake of chocolate, so that before the first cake is entirely used a second one may be placed in rear of it by drawing back the follower. This arrangement prevents any loss from breaking of waste ends.

Having thus described my invention, I claim—

1. The combination of a feed-channel, A, a cutting or shaving tool, C, and a receptacle, F, substantially as and for the purpose specified.

2. In combination with the feed-channel A and cutting-tool C, a follower, D, substantially as and for the purpose set forth.

In testimony that the above is a true specification of my invention, I have hereunto signed my name this 16th day of May, 1873.

EDWIN C. KIRKWOOD.

Witnesses:
  DANIEL CARRIGAN,
  THAD. K. SAILER.